UNITED STATES PATENT OFFICE 2,453,213

PROCESS OF TREATING LIGNIN RESIDUES

Eduard Farber, Washington, D. C., assignor to Timber Engineering Company, Washington, D. C., a corporation of Delaware No Drawing. Application May 10, 1945,
Serial No. 593,101

15 Claims. (Cl. 260—124)

When the carbohydrates of wood are hydrolyzed, an undissolved residue is left. The term "wood" is used herein in a broad sense, i. e. as meaning the woody structures of vegetable growths generally and as including stems, stalks, seed hulls, etc. of all kinds, as well as the trunks and limbs of trees. An example of the hydrolyzing action referred to is the treatment of sawdust and shavings with 0.5% sulfuric acid at between 150° C. and 180° C. to dissolve carbohydrates in the manufacture of sugar from wood. The undissolved matter left from this action, at least when freed from adherent sugar and acid solution by washing in water, is an example of the residue referred to. At least for the most part such residues are derived from the lignin of the wood. Chemically they are not the initial lignin however. Neither are they identical with the product obtained from lignin when agents are used to transform lignin into water-soluble substances, as in the manufacture of cellulose.

For conciseness hereafter I use the terms "ligninic residue" and "lignin residue" as meaning the undissolved residue left when hydrolyzing the carbohydrates of wood, the term "wood" being used here in the broad sense indicated above.

It is known that this lignin residue can be transformed into various depolymerization and oxidation products by reaction with a large excess of sodium hydroxide and/or potassium hydroxide at rather high temperatures in the presence of rather small amounts of water, say ten (10) parts of the alkali and from one-half (½) to one (1) part of water to one (1) part of the residue, by weight, at about 200° C. For the most part at least these old processes break down the residue into derivatives of low molecular weights. I have discovered however that under proper conditions and with much smaller quantities of alkalis, most of the lignin residue can be transformed into materials of relatively high molecular weight and of resinous nature.

Speaking generally, my process consists of, first, forming a mixture of lignin residue and an alkali or alkalis in the proportions, by weight, of one hundred (100) parts of the residue to between about twenty (20) and about two hundred (200) parts of alkali. However when the mixture is composed solely of the ligninic residue, alkali, and some water to carry the alkali as referred to again below, the resin-forming reaction is obtained only with difficulty usually, and some uncertainty, when the smaller of such relative quantities of alkali are used, e. g. about twenty (20) parts of alkali to about one hundred (100) parts of lignin residue. On the other hand, above the larger of such relative quantity of alkali, e. g. above about two hundred (200) parts of alkali to about one hundred (100) parts of the lignin residue, conditions are approached where reactions other than those here contemplated occur. Preferably I use from about sixty-five (65) to about one hundred (100) parts of alkali to each one hundred (100) parts of the lignin residue; these proportions seem to be about the most economical at the present time, and to yield the most nearly reproducible reactions and results. Further, while apparently any of the various alkalis can be used with my process, and apparently any mixtures of them, sodium hydroxide is both sufficient and convenient and I prefer it as the alkali of my process.

The lignin residue and the alkali can be mixed dry if desired, or, say, the alkali can be dissolved, for example in water, and this solution mixed with the residue. The water in such a case is primarily only a carrier for the alkali and accordingly substantially any convenient quantity of water can be used, it being observed however that unduly large quantities may delay the reaction with the lignin. With one hundred (100) parts of the powdered residue, from about seventy-five (75) to about one hundred and fifty (150) parts of water, by weight, is a convenient quantity. The mixture, even with such quantities of water, is not a liquid, but rather is like a wet powder.

To the residue-alkali mixture I apply heat to raise its statistical mean temperature to between about 150° C. and a higher temperature at which the lignin residue chars or burns, at the same time taking care to avoid local temperature rises to such higher degrees as might char or burn any considerable part of the residue. For example, I may agitate the mass continuously during the heating or reaction period as by stirring, so as to maintain the temperature as uniform through the mass as may be reasonably possible or necessary. If desired of course the heating can be begun before the constituents are thoroughly mixed one with the other, but speaking generally the mixture should be brought to a homogenous condition before its temperature much exceeds the lower of the two limits. When the mixture consists solely of the residue, alkali and a convenient quantity of water, the temperature, or the statistical mean temperature of a well stirred mass, at which charring occurs, is about 220° C., and hence this is the upper temperature limit of the process under such conditions. Under other conditions the upper temperature limit may be higher, as when other substances are included in the mixture, for example, some of the possible additive materials referred to hereafter; with such additions the upper limit may be about 250° C. or even higher.

Within these temperature limits, at say atmospheric pressure, the reaction comes to completion. Completion of the reaction is indicated by the color of the reacting mass changing from a dark brown to a brown yellow, and by a visual aggregation of the mass into lumps, and by a rather sudden increase in the resistance of the mass to stirring. Any one of these phenomena can be taken as indicating that the reaction is completed. If the heat applied is only sufficient to maintain the temperature of the mass in the lower part of the temperature range, the reaction, at least in some instances apparently, may be brought to completion by no other action than continuance of the heating and provision for the avoidance of local temperature rises to such extent as to cause undue charring, for example by such stirring as may be necessary to this end. If however by the applied heating the temperature is raised somewhat higher or more nearly toward the upper limit, as it may be in order to hasten the reaction, the resin-forming reaction, or possibly some side reaction, frequently becomes exothermic, and exothermic to such an extent as to raise the temperature of the mass to charring even if the external heating is discontinued. This tendency to exothermic action is indicated by the mass showing signs of melting, by the appearance of yellow spots in the mixture, or by the mass lumping locally. When such an exothermic action starts I usually discontinue the application of heat (since now it is unnecessary), but in any event I apply cooling to such an extent as may be necessary to hold the temperature of the mass below the charring degree, while permitting it to remain in the reaction range for so long as may be necessary to bring the reaction to completion. For example, I may pass air or other inert gas through the reacting mass, or pass saturated but not superheated steam through it, or I may add water to the mass. During this exothermic stage I continue to take care to avoid local temperature rises to the extent of considerable charring or burning of the residue. For example I may (and usually I do) continue the agitation, as by stirring, or when cooling by passing gas or vapor, I may distribute the gas or vapor flows throughout the reacting mass, or I may use both such expedients. Usually the reaction comes to completion a short time after the exothermic action begins, a matter of some seconds or a few minutes.

The reactivity of the lignin residue toward my process can be improved somewhat by removing from it as a preliminary step, any non-ligneous material it may contain, for example by pretreating it in a hot solution of calcium hydroxide or calcium chloride or both. For example, before mixing the residue with the reaction alkali, the residue may be washed for say five or ten minutes in a solution of from about five one-hundredths (0.05) to about five-tenths (0.5) of a part of calcium hydroxide and from one-tenth (0.1) of a part to two (2) parts of calcium chloride in from three hundred (300) to one thousand (100) parts of water, all by weight, heated to about 95° C. As an alternative, it may be washed in a solution of between one (1) and ten (10) parts of calcium chloride in about five hundred (500) parts of water, and then in a solution of between two one-hundredths (0.02) and four-tenths (0.4) of a part of lime ($Ca(OH)_2$) in about five hundred (500) parts of water, each heated to about 95° C. Treatment in either of these two latter solutions alone is better than no pretreatment; treatment in both is still better. However the proportions above are not critical. In either instance the solution may be a saturated solution. Also neither the temperature nor the length of the pretreatment is critical. All are subject to considerable variation as will be understood. After such a pretreatment the lignin residue may be dried before being subjected to the resin-forming reaction, or merely most of the pretreatment liquid pressed out of it and the residue used wet.

Also the resin-forming reaction between the alkali and the lignin residue can be promoted by the addition to the reaction mixture of inorganic agents, such as sulfur, zinc oxide, aluminum oxide, and stannic oxide, which themselves are capable of reacting with the alkali. One or more of such additives can be used at a time. The addition can be made at the time the alkali and residue are mixed together. Quantities less than one (1) part of additive to one hundred (100) parts of the lignin residue are only slightly effective. The maximum effect is obtained at about ten (10) parts of additive to each one hundred (100) parts of lignin residue. Quantities of additive greater than this seem to be unnecessarily excessive. Speaking generally the addition of such a substance to the reaction mixture raises the temperature at which charring or burning of the residue occurs, and thus raises the upper temperature limit of the resin-forming reaction and the factor of safety; usually too it raises the temperature at which the exothermic action mentioned above begins.

After the resin-forming reaction has come to completion, (phenomena indicating this stage have been pointed out above), any further possible reactions in the reaction mixture are prevented simply by discontinuing the application of heat and cooling the mixture, or allowing it to cool, provided the reaction has not reached the exothermic stage. If a reaction has become exothermic however, then at the completion of the resin-forming reaction I terminate all further reactions in the reaction mixture by cooling the mixture below the point at which the exothermic action can continue. For example, this can be done by adding water to the reacted mixture. In any event in order to separate the resin produced from the lignin residue from the other constituents of the reaction mixture, I usually add, say, water to the reaction mixture to bring it to a fluid condition. To this aqueous reacted mixture I then add an acidifying agent to bring the mixture to a pH value of about two (2), after conditions in the mixture have become stable. This action causes the resinous product to precipitate, and the precipitate may then be separated from the liquid of the mixture in some convenient way, for example by pressure filtration, and washed with water to free it of adhering acids and salts. The filtrate remaining after the separation of the precipitate contains principally oxalic and ligninic acids, and derivatives of the alkali reagent. The precipitate recovered is a fine brown powder comprising a large part of the substance of the lignin residue, and as indicated has the characteristics of a resin. If after washing it is dried at low temperatures, say below 70° C., it is soluble in dilute alkaline media, and in organic solvents like alcohol, ketones and mixtures of aromatic solutions. Such solutions of it can be used as coating and impregnating materials. If dried at temperatures of about 100° C. and higher, the powder becomes substantially insoluble, at least in customary solvents. The powder, dried under either of these conditions, melts at about 130° C., and under some continued heating solidifies. It can be used accordingly for the ordinary purposes of thermosetting resins. The powder can be used also as a filler for paper, plastics, etc.

The following examples are illustrative of my process:

Example 1.—Take one thousand (1000) grams of lignin residue. For example, this may be the residue of the hydrolyzing process mentioned above, after a short period of washing with water to remove adherent sugar and acid solution. Place this one thousand (1000) grams of lignin residue in five (5) liters of a saturated solution of calcium hydroxide and water (containing perhaps five (5) to ten (10) grams of calcium hydroxide) heated to near the boiling point, and stir the residue in the solution for, say, five (5) to ten (10) minutes, while substantially maintaining the temperature. Then separate the lignin residue from the solution by a pressure filter. Then mix the thus pre-treated residue with one and one-half (1½) liters of a water solution containing eight hundred (800) grams of sodium hydroxide. The resulting mixture will contain no free liquid, but have the form of a wetted powder. Heat this mixture in a steel kettle provided with a scraping agitator until the temperature reaches 165° C. or a little more, and at all times having the agitator in operation. The heat may then be shut off, but the agitation is continued, and in a short time the temperature will rise to something like 180° C. or 190° C. because of the exothermic nature of some reaction. As the temperature comes to something like 180° C. to 190° C., pass saturated but not superheated steam through the mixture in sufficient quantities to hold the temperature of the mass as a whole at about 180° C. or 190° C. (or even to cool it somewhat); in doing so, distribute the steam through the mass so as to prevent (with the aid of the stirring if the latter is continued during this stage of the operations) the temperature rising anywhere in the mass to such a higher degree as to cause undue local burning or charring. In a short time the powdered mixture may seem to be about to melt, and its color will change from its initial brown to a brown yellow, and it will tend to collect into lumps with an accompanying rather sudden increase in its resistance to stirring. These phenomena indicate that the resin-forming action is completed. Thereupon add water to the reaction mixture to stop further chemical action in it. A greater quantity can be added if desired. Usually about two (2) liters of water will be sufficient. Then (or later and after some further cooling if desired) add sulfur dioxide to this aqueous reaction mixture to bring it to a pH value that becomes stable at about two (2). This action precipitates the resinous material desired; the latter contains the greater part of the substance of the initial lignin residue, while the liquid portion of the aqueous mixture contains oxalic and ligninic acids among other things. Thereupon separate the precipitate from the liquid portion of the mixture by pressure filtration, wash it with water to remove adhering acids and salts, and thereafter dry it either at the low or high temperatures before indicated, with the ultimate results before pointed out. Any vapors that are driven off during the reaction or reactions in the kettle, may be permitted to escape from the reaction mass.

Example 2.—Mix one thousand (1000) grams of lignin residue with a solution of seven hundred and fifty (750) grams of sodium hydroxide in seven hundred and fifty (750) grams of water. As a preliminary step, preferably the residue is pretreated with hot calcium hydroxide solution as described in Example 1. Then stir twenty (20) grams of precipitated sulfur into the residue-hydroxide mass, mixing the constituents thoroughly. Now apply heat to the mixture while thoroughly stirring it, until a temperature of about 190° C. is reached. At about this temperature an exothermic action begins; this point in the reaction can be recognized by the tendency of the temperature to rise rather rapidly, or by the appearance of yellow spots in the mixture. At this stage discontinue the application of heat, and also apply cooling to the reacting mixture (for example by saturated steam as in Example 1, or by adding water to the mixture) so far as this may be necessary to prevent the temperature rising much above 210° or 220° C. After a few minutes the mass will be found to be slightly sintered. Now add water to terminate the reaction or reactions and acidify the reacted mixture by adding about nine hundred (900) grams of commercial sulfuric acid or until precipitation is completed. The precipitate is the resinous material sought. Separate this precipitate from the liquid of the mixture, wash it in water, and dry it (for example, as in Example 1 above). The resinous material thus procured will amount to about nine hundred (900) grams. Initially the precipitate is a dry brown powder resinous in nature. On heating to about 150° C. it becomes a viscous liquid, and on continued heating solidifies again. The liquid phase of the reaction mixture separated by the filtration contains small amounts of organic acids, phenolic substances, etc., which can be extracted in known manners if desired. Care is taken to avoid undue local temperature rises as well after discontinuing the application of heat as before; e. g. by continuous stirring of the reaction mixture up to the time the temperature is brought down below the point where the exothermic action ceases.

Example 3.—The procedure in this example is exactly the same as in Example 1, excepting that fifty (50) grams of zinc oxide are added to the sodium hydroxide solution before the latter is mixed with the lignin residue. The final precipitate obtained on acidifying the reacted mixture is somewhat more soluble with solvents like alcohol and acetone, than the resinous precipitate of Example 1.

It will be understood of course that my invention is not limited to the details of operation, proportions and materials mentioned above except as appears hereafter in the claims.

What is claimed is:

1. The process of treating the ligninic residue of the hydrolyzation of the carbohydrates of wood, which comprises mixing the residue with alkali in the proportions, by weight, of one hundred (100) parts of the residue to between about twenty (20) and about two hundred (200) parts of the alkali, and heating the mass and maintaining it at a temperature between about 150° C. and not substantially above 250° C., until the residue has substantially resinified.

2. The subject matter of claim 1, characterized by the fact that the residue and alkali are mixed in the proportions, by weight, of one hundred (100) parts of residue to between about sixty-five (65) and about one hundred (100) parts of the alkali.

3. The subject matter of claim 1, characterized by the fact that the alkali is sodium hydroxide.

4. The subject matter of claim 1, characterized by the fact that preliminary to said mixing the alkali is dissolved in water, and thereafter the alkali solution is mixed with the residue.

5. The process of treating the ligninic residue of the hydrolyzation of the carbohydrates of wood, which comprises mixing the residue with alkali in the proportions, by weight, of one hundred (100) parts of the residue to between about twenty (20) and about two hundred (200) parts of the alkali, and establishing a temperature in the mass of between about 150° C. and not substantially higher than 250° C. while agitating the mass.

6. The process of treating the ligninic residue of the hydrolyzation of the carbohydrates of wood, which comprises mixing the residue with alkali in the proportions, by weight, of one hundred (100) parts of the residue to between about twenty (20) and about two hundred (200) parts of the alkali, applying heat to the mass to raise its temperature to from about 165° C. to about 190° C. until an exothermic action begins, and then cooling the mass to substantially prevent its temperature rising above about the temperature at which the residue chars.

7. The process of treating the ligninic residue of the hydrolyzation of the carbohydrates of wood, which comprises mixing the residue with alkali in the proportions, by weight, of one hundred (100) parts of the residue to between about twenty (20) and about two hundred (200) parts of the alkali, applying heat to the mass to raise its temperature to from about 165° C. to about 190° C. until an exothermic action begins, then cooling the mass to substantially prevent its temperature rising above about the temperature at which the residue chars, and when the residue has been substantially converted to resin, cooling the mass below the temperature at which the exothermic action can continue.

8. The process of treating the ligninic residue of the hydrolyzation of the carbohydrates of wood, which comprises mixing the residue with alkali in the proportions, by weight, of one hundred (100) parts of the residue to between about twenty (20) and about two hundred (200) parts of the alkali, applying heat to the mass to raise its temperature to from about 165° C. to about 190° C. until an exothermic action begins, and when the residue has been substantially converted to resin, cooling the mass below the temperature at which the exothermic action can continue.

9. The subject matter of claim 1 characterized by an additional step, namely, removing non-ligneous material from the residue, said additional step preceding the step of mixing the residue with alkali.

10. The subject matter of claim 1, characterized by the fact that before the residue and alkali are mixed, the residue is treated in a hot solution of a substance selected from the group consisting of calcium hydroxide, calcium chloride, and mixtures thereof.

11. The subject matter of claim 1, characterized by the fact that at least one agent selected from the group consisting of zinc oxide, aluminum oxide and stannic oxide, in the proportions, by weight, of between one (1) and ten (10) parts of the agent to each one hundred (100) parts of residue, is included in the mixture of residue and alkali.

12. The subject matter of claim 1, characterized by the fact that after the residue has been substantially converted to resin, water and an acidifying agent are added to the reacted mass to precipitate the resin from the remainder of the reacted mass.

13. The subject matter of claim 1, characterized by the fact that after the residue has been substantially converted to resin, water and an acidifying agent are added to the reacted mass to precipitate the resin from the remainder of the reacted mass, and the precipitate is separated from the accompanying liquid, and is washed.

14. The process of treating the ligninic residue of the hydrolyzation of the carbohydrates of wood, which comprises heating a mixture of the residue and alkali in the proportions, by weight, of one hundred (100) parts of the residue to between about twenty (20) and about two hundred (200) parts of the alkali to raise the temperature of the mass to from about 165° C. to about 190° C. until an exothermic action begins, and then cooling the mass by the passage of saturated steam therethrough to substantially prevent its temperature rising above the temperature at which the residue chars.

15. A process according to claim 6 in which the reaction mixture is heated to about 190° C. until exothermic action begins and in which at least one agent selected from the group consisting of zinc oxide, aluminum oxide and stannic oxide, in the proportions, by weight, of between one (1) and ten (10) parts of the agent to each one hundred (100) parts of the residue, is included in the mixture of residue and alkali.

EDUARD FARBER.

REFERENCES CITED

The following references are of record in the file of this patent:

FOREIGN PATENTS

| Number | Country | Date |
|---|---|---|
| 441,770 | Germany | Mar. 12, 1927 |

OTHER REFERENCES

Fruedenberg et al., "Berichte," vol. 69 B, (1936), pg. 1424.

Fruedenberg et al., "Berichte," vol. 71 B, pp. 1822–1824 (1938).

Wise, "Wood Chemistry," Reinhold, 1944, pp. 327–332.

Sarkar, "Journal Indian Chemical Soc.," vol. 10, pp. 266–268.